United States Patent [19]
Fogal, Sr.

[11] Patent Number: 5,522,910
[45] Date of Patent: Jun. 4, 1996

[54] END-LINE COMPRESSED AIR MOISTURE FILTER

[76] Inventor: Robert D. Fogal, Sr., 15 Kenwood Rd., Chambersburg, Pa. 17201

[21] Appl. No.: 303,492

[22] Filed: Sep. 9, 1994

[51] Int. Cl.⁶ .................................................. B01D 35/02
[52] U.S. Cl. ........................ 55/505; 55/528; 55/DIG. 17; 137/223; 137/544
[58] Field of Search ............................ 55/417, 420, 505, 55/527, 528, DIG. 17; 137/223, 544, 549; 96/118, 149

[56]  References Cited

U.S. PATENT DOCUMENTS

| 1,091,695 | 3/1914 | Nolden | 55/417 |
|---|---|---|---|
| 1,767,056 | 6/1930 | Donnelly | 55/417 X |
| 2,109,230 | 2/1938 | Hammond | 137/223 |
| 3,261,146 | 7/1966 | Malec | 55/417 X |
| 3,386,230 | 6/1968 | Riesberg et al. | 55/505 X |
| 4,886,533 | 12/1989 | Sakashita et al. | 55/498 |
| 4,908,052 | 3/1990 | Largman et al. | 55/528 X |
| 5,122,167 | 6/1992 | Daniels | 55/524 X |
| 5,409,514 | 4/1995 | Ragusa et al. | 55/DIG. 17 |
| 5,413,230 | 5/1995 | Folter et al. | 137/544 X |

FOREIGN PATENT DOCUMENTS

| 979470 | 4/1951 | France . |
|---|---|---|
| 2226295 | 11/1974 | France . |
| 1024828 | 2/1958 | Germany . |
| 2160442 | 12/1985 | United Kingdom . |
| 8700439 | 1/1987 | WIPO . |

*Primary Examiner*—Richard L. Chiesa
*Attorney, Agent, or Firm*—Oldham & Oldham Co.

[57] ABSTRACT

The invention is directed to a portable and easy to use end-line filter designed to be utilized between a source of compressed air such as a pneumatic hose with an air chuck on its terminal end, and the inlet valve of an inflatable such as a pneumatic tire, to remove moisture from the compressed air before the compressed air enters the inflatable. The invention may also be utilized between the end of a pneumatic hose and a compressed air powered tool. A porous filter media is utilized which has pores that allow the passage of air but do not allow the passage of water or moisture. As the filter becomes saturated, the pores progressively close and eventually block the passage of air. In this manner, the filter automatically indicates the need for a replacement filter element.

34 Claims, 2 Drawing Sheets

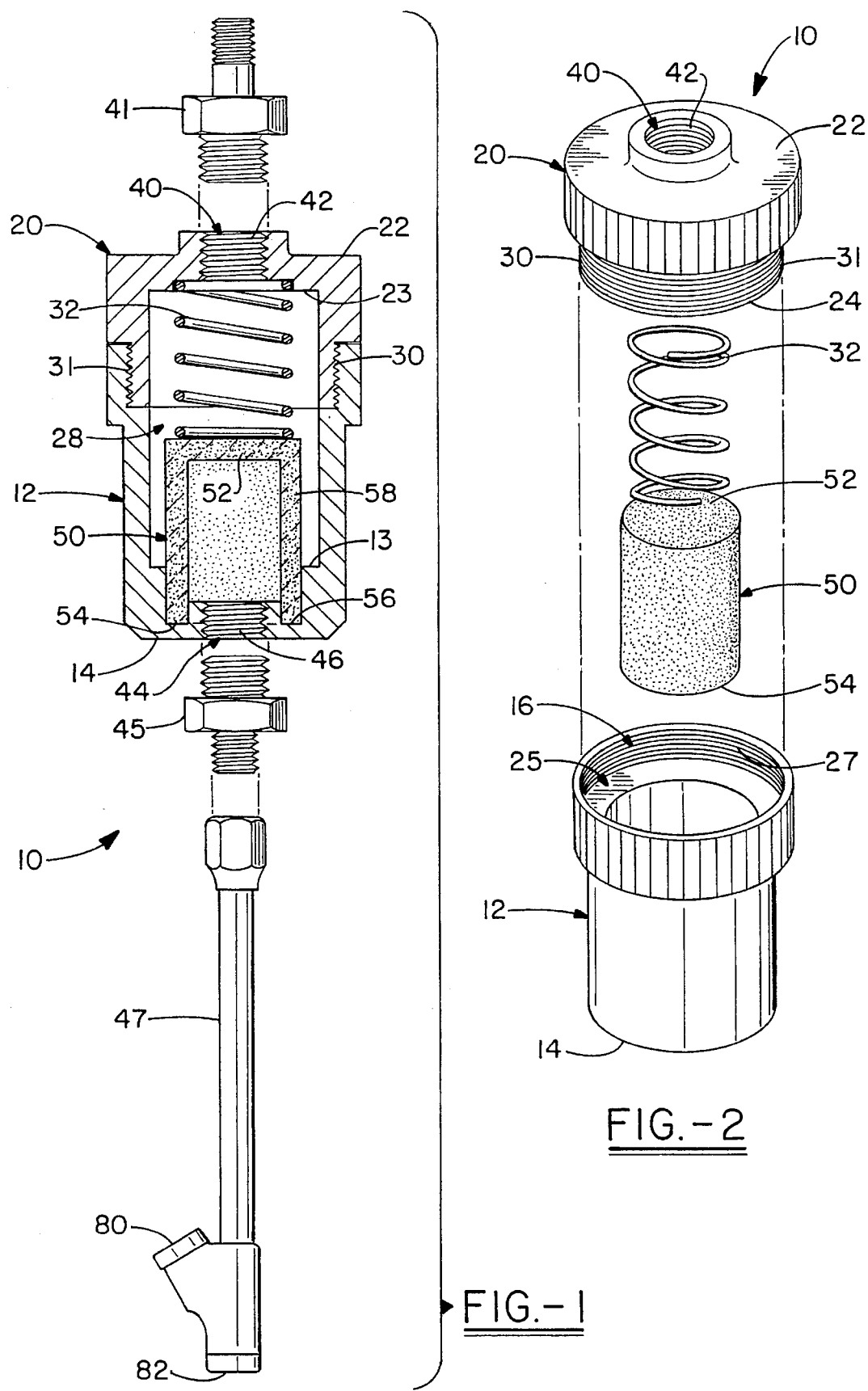

5,522,910

END-LINE COMPRESSED AIR MOISTURE FILTER

FIELD OF THE INVENTION

The present invention relates generally to a moisture filter and more particularly to a portable and easy to use end-line filter designed to be utilized between a source of compressed air such as a pneumatic hose with an air chuck on its terminal end, and the inlet valve of an inflatable such as a pneumatic tire, to remove moisture from the compressed air before the compressed air enters the inflatable. The invention may also be utilized between the end of a pneumatic hose and a compressed air powered tool.

BACKGROUND OF THE INVENTION

It is well known that compressed gases, including air, generally contain some moisture. This moisture occurs in compressed air as a natural result of the air being compressed and due to other causes such as the formation of condensation in the interior of a compressed air storage tank. One application in which the presence of moisture in compressed air is particularly undesirable is when such air is being utilized to pressurize truck or automobile tires. The moisture contained in compressed air is corrosive to the steel rims upon which tires are often mounted. Over time, this corrosion may cause leaks between the rim and the bead of the tire, and may weaken the rim itself. Additionally, the rust formed may flake off of the steel rim and collect in the interior of the tire. These rust flakes may clog the tire valve stem and also may abrade the lining of the tire. Such corrosion often requires the tire to be removed from the rim so that the rim can be cleaned and repainted. The moisture contained within tires is also destructive to the steel belts found in an increasing majority of tires. Over time, the steel belts corrode and weaken which may cause a failure of the tire before the tread life has been exhausted.

Prior moisture filters have been designed to be relatively permanently installed in-line to remove moisture from compressed air. In-line moisture filters are not commonly installed and are typically utilized only by those owning specialty systems for compressing air in a laboratory or manufacturing environment. Compressed air systems as are typically found at a gas station or truck service area ordinarily have no such filter. One in need of compressed air to pressurize a "flat" tire generally must use whatever source of compressed air is available and is not able to search for a source which employs an in-line filter.

The moisture contained in compressed air can also be destructive to tools powered by compressed air. Such tools, such as pneumatic impact wrenches can become internally corroded and their usefulness can be reduced or destroyed.

SUMMARY OF THE INVENTION

The present invention is therefore directed to a small, lightweight, portable, and easy to use end-line filter for removing moisture from a stream of compressed air. The invention is directed to an apparatus for filtering moisture from a stream of compressed air and, in the preferred embodiment, is designed to be utilized directly between the inlet valve of an inflatable and an air chuck disposed on the terminal end of a pneumatic hose, and comprises a substantially closed filter chamber formed from a generally hollow housing having an inlet port and an outlet port; inlet valve means for communicating with a source of compressed air, said inlet valve means disposed in said inlet port and capable of fluid communication with said filter chamber; an outlet fitting disposed in said outlet port for fluid communication between said filter chamber and said inlet valve of said inflatable; filter means disposed within said filter chamber for filtering moisture from said stream of compressed air between said inlet valve means and said outlet fitting.

The filter means of the present invention is preferably an easy to change filter element which indicates its need to be changed by preventing the further passage of any compressed air when it becomes saturated with moisture. The housing is preferably formed of two generally cylindrical members, a filter container and a cap therefore, which join together by means of complementary threads. The filter element is preferably made of a porous material having pores that allow the passage of air but are impervious to water molecules. The pores of the filter element progressively close as the filter element absorbs moisture and the pores completely close and thereby prevent the passage of air therethrough when the filter element becomes completely saturated. By preventing the passage of compressed air when saturated, the present invention automatically indicates when a the filter element must be removed and a new filter element installed.

The inlet valve means is preferably a "tank" valve which is the same or similar to an inlet valve that is commonly used as a tire valve stem and is likewise designed to be compatible with an outlet source of compressed air such as an air chuck located at the discharge end of a conventional pneumatic hose as may be found at a gas station or truck service area. The outlet fitting located at the outlet port preferably has threads to allow for the threaded attachment of an air chuck which is designed to mate with a conventional tire valve stem. A special elongated dual foot air chuck or adapter may be connected to the outlet fitting to facilitate the pressurizing of truck tires. In addition, a "quick-connect" pneumatic coupling may be utilized on outlet fitting in place of threads to allow for the easy interchangeable attachment of various air-chucks or to provide a direct quick-connect mating fit with the inlet valve of the inflatable being pressurized. The outlet fitting may be an air chuck or a quick connect coupling which threads directly into the outlet port without the requirement of any intermediate coupling or adapter.

In another preferred embodiment, the present invention may be configured to filter moisture form compressed air being utilized to power a pneumatic tool such as a pneumatic impact wrench. In such an embodiment, the filter chamber and the filter element disposed therein are of a larger volume and size, respectively, so that the invention is capable of delivering a larger volume of filtered air per minute as is required for such an application. Also, quick-connect pneumatic fittings are preferably provided at both the inlet port and the outlet port to allow for easy use of the device between the end of a pneumatic hose and a pneumatic tool.

BRIEF DESCRIPTION OF THE DRAWINGS

FIG. 1 is an axial cross-sectional view showing one embodiment of the present invention;

FIG. 2 is an enlarged exploded view of a portion of the present invention as shown in FIG. 1.

DETAILED DESCRIPTION OF THE PREFERRED EMBODIMENT

Figure 1A:
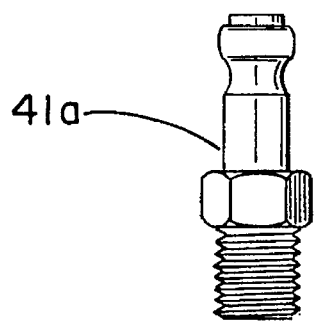
FIG. 1a shows an alternative inlet fitting to that shown in FIG. 1.

Reference will now be made in detail to the preferred embodiment of the present invention which is illustrated in the accompanying drawings. The invention, shown generally at 10 preferably includes a first generally hollow cylindrical shaped housing member or container 12 which is substantially closed at end 14 and open at end 16, and a second generally hollow cylindrical shaped housing member or cap 20 which is substantially closed at end 22 and open at end 24. Open end 16 of container 12 contains a counter-bore 25 of larger diameter than container 12 having internal threads 27. Open end 24 of cap 20 contains a downward depending annular rim 30 which is preferably of slightly smaller external diameter as compared with external diameter of cap 20. Downward depending rim 30 includes external threads 31 which are complimentary with and designed to mate with internal threads 27 of counter-bore 25 to allow cap 20 to be threadably secured to container 12 to form a filter chamber 28. An O-ring (not shown) or other gasket means as is known in the art is preferably disposed at a point where container 12 and cap 20 are secured together to form an air-tight seal between container 12 and cap 20. It will be recognized by those of ordinary skill in the art that a variety of shapes and sizes of members 12,20 exist as well as numerous means of fastening members 12,20 together. The invention is not meant to be limited to cylindrical container and cap members 12,20 which are designed to be threadably secured together as shown. For example, the invention may utilize non-cylindrical housing members and/or attachment means such as a plurality of retaining clips to fasten members 12,20 together rather than the mating threads as shown.

Cap 20 contains an inlet port 40 formed through end 22 to be in fluid communication with filter chamber 28 and having internal threads 42 to allow for the threaded attachment of a inlet fitting 41 to function as inlet valve means. Inlet fitting 41 is preferably a "tank" valve as is well known in the art and which operates the same as or similar to a conventional tire valve stem. Many such fittings are well known in the art, the preferable being commonly known as a Schrader-type valve and being manufactured by Schrader Automotive, Inc., Charlotte, N.C. Such a valve allows for the mating attachment of a pneumatic fitting or air chuck as is typically found at gas stations or truck service areas to provide a means for introducing compressed air into chamber 28. As seen in FIG. 1a, inlet fitting 41 may alternatively be a quick-connect fitting 41a to allow for removable hands-free attachment of the invention 10 to a complimentary quick-connect fitting disposed on the terminal end of a pneumatic hose.

Figure 1B:
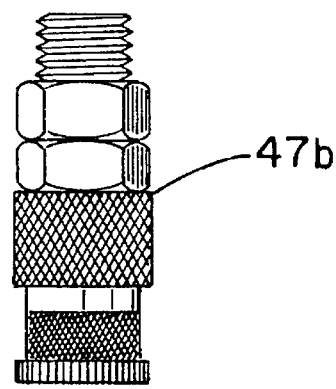
FIG. 1b shows a quick-connect outlet fitting as an alternative to the outlet fitting shown in FIG. 1.
Figure 1C:
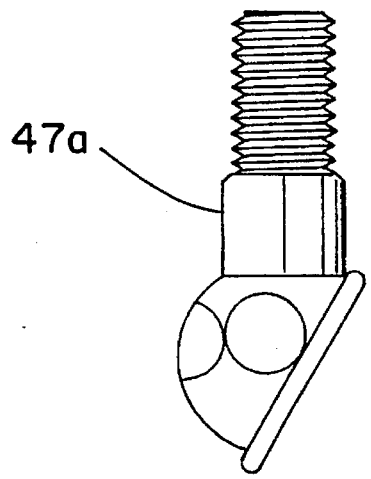
FIG. 1c shows an alternative outlet fitting to that shown in FIG. 1.

Container 12 contains an outlet port 44 formed through end 14 to be in fluid communication with filter chamber 28 and having internal threads 46 to allow for the threaded attachment of an outlet pneumatic fitting 45. Outlet pneumatic fitting 45 is preferably threaded to allow for the attachment of a tire valve stem air chuck 47 such as may be found at the terminal end of a pneumatic hose. Air chuck 47 is preferably designed to mate with a conventional tire valve stem such as a Schrader valve or a similar valve stem to allow for the introduction of substantially moisture free air into a tire or other inflatable. As seen in FIG. 1, air chuck 47 is preferably an elongated dual foot air chuck having a dual outlet ports 80 and 82 to facilitate pressurizing truck tires. Alternatively, as seen in FIG. 1c, air chuck 47 may be a shorter ball-foot air chuck 47a or other shorter air chuck which is more suitable for use with passenger car or light truck tires. Additionally, a short length of flexible pneumatic tubing having an air chuck extending therefrom may be attached to outlet fitting 45. Although outlet fitting 45 is preferably a threaded pneumatic coupling to allow for the attachment of the various air chucks (47,47a), it is also contemplated that outlet fitting 45 may alternatively provide a "quick-connect" pneumatic coupling as is well known in the art to allow for interchangeable attachment of a variety of air-chucks or other pneumatic fittings.

Those skilled in the art will recognize that many different types of pneumatic fittings exist which allow for an almost unlimited variety of connections at both inlet port and outlet port. In certain embodiments, inlet fitting (41,41a), outlet fitting 45, or air chuck (47,47a,47b) may be permanently molded into cap 20 or container 12 during the manufacturing process. Alternatively the, outlet fitting 45 may itself be an air chuck which is directly threaded or otherwise disposed in outlet port 44 to provide direct fluid communication between filter chamber 28 and the inlet valve of a tire or other inflatable, as opposed to indirect fluid communication as would occur when outlet fitting 45 is utilized between outlet port 44 and air chuck (47,47a,47b). As seen in FIG. 1b, air chuck 47 may be replaced by a quick-connect pneumatic coupling 47b, which is threadably or otherwise disposed on outlet fitting 45 or directly in outlet port 44, which functions as a means for clamping air chuck 47b onto a tire valve stem to provide for easier use of the invention 10.

In the preferred embodiment, a generally cylindrical cup-shaped filter element 50 having a closed end 52 and an open end 54 is disposed within chamber 28 such that open end 54 lies in an annular groove 56 formed in the interior surface 13 of end 14 of container 12. Annular groove 56 is preferably concentric with outlet port 44 and has a width and diameter designed to accommodate the width of the wall 58 of filter element 50. Biasing means, which in the preferred embodiment is a spring 32, is disposed within chamber 28 between closed end 52 of filter 50 and interior surface 23 of cap 20 to bias filter 50 into groove 56. It is thought preferable to dispose filter element 50 in such an orientation, although those skilled in the art will recognize that annular groove 56 may be alternatively formed concentric with inlet port 40 to allow filter element 50 to be biased adjacent to interior surface 23 of cap 20 rather than interior surface 13 of container 12.

The filter element 50 preferably is made from a material having pores which allow for the passage of air therethrough but which do not allow for the passage of water or moisture. The filter element 50 will eventually become contaminated with moisture and therefore must be replaced. This filter 50 is specially designed to indicate the need for replacement by preventing the flow of any air. In this manner, the filter 50 automatically ensures that no unfiltered or incompletely filtered air passes through the filter. This is accomplished by forming the filter 50 from a water insoluble highly water absorbent porous material which has pores that allow for the passage of air but not the passage of water. As the filter 50 becomes contaminated with water, the filter media swells causing the pores to become smaller in size. Eventually, when the filter 50 is saturated, the pores will be completely closed and no further air can pass therethrough. Cap 20 may then be unthreaded from container 12 and filter element 50 may be removed and replaced by a new filter element. Cap 20 can then be re-threaded onto container 12 to allow for further filtering operation. The saturated filter element 50 is preferably manufactured of such materials that allow it to be cleaned, dried, and reused.

The filter 50 is commercially available from SKD Pneumatics, Morgantown, Pa., and may be manufactured from a variety of media known in the art to have these characteristics. A preferred material is a water-insoluble, highly water-absorbent material comprising synthesized resins, including, for example, chemically treated, naturally occurring polymeric materials and synthetic polymeric materials prepared by polymerization of monomers. An exemplary class of materials prepared from chemically treating naturally occurring polymeric materials comprises those which are synthesized from naturally occurring polymeric materials such as, for example, carboxymethylcelluloses, polysaccharides such as, for example, starch and natural gums such as guar gum, and from vinyl compounds which are reactive therewith.

A preferred water-insoluble, highly water-absorbent material is a graff starch polymer, but other water-insoluble, highly water-absorbent materials, such as cross-linked poly (alkylene oxide) resins, cross-linked polyacrylate resins, and cross-linked carboxy methycellulose resins may be used in the practice of the invention. Species of such resins are known and include materials which are available commercially.

Examples of commercially available water-absorbent resins include the following trademark products sold by Grain Processing Corporation: Water-Lock A-100 characterized as being insoluble in most organic solvents and having the ability to absorb at least 110 ml of water/g of resin; Water-Lock J-500 characterized as being capable of absorbing at least 500 ml of water/g of resin; and Water-Lock J-550 characterized as being capable of absorbing at least 375 ml of water/g of resin. Such resins are described by their manufacturer as being super absorbent products which are prepared by hydrolyzing starch/acrylonitrile graft copolymers to form polymeric products having side chains which contain carboxamide and carboxylate groups. The aforementioned resins are available commercially as free flowing powders. Other sources of the resins include Arakawa Chemical (U.S.A.) Inc. which sells its resins under the trademark "ARASORB" and Sanyo Chemical, Unilever, Hercules and Dow Chemical.

Filter element 50 may be made entirely from the water-insoluble, highly water-absorbent material or a mixture of such materials, or it may be made from such material(s) and one or more other materials, including major amounts of such other materials. Examples of classes of such other materials include carriers, fillers, and additives which improve the physical and/or chemical properties of the composition comprising the device. In this regard, filter element 50 may comprise, for example, polyethylene, acrylic resin, and nylon (to name but a few), a filler material(s) such as, for example, calcium carbonate, lubricant, antioxidant, fibers including both synthetic and natural fibers, and materials which modify one or more of the aesthetic, physical and chemical properties of the composition, for example, molybdenum disulfide. Synthetic resins which are capable of being sintered can be used to good advantage in the practice of the present invention. Polyolefins, particularly polyethylenes and polypropylenes, are preferred examples of such materials.

An attractive feature of the present invention is that relatively small amounts if the highly water-absorbent resin may be used in fabricating filter element 50. Thus, a minor amount of the resin may be combined with a major amount of the carrier or filler material(s), including material(s) which is less costly than the water-absorbent resin. In addition to cost advantages, the strength of filter element 50 may be improved by the use of a carrier material, preferred materials being polyethylenes, and polypropylenes having a molecular weight of at least about 900,000 to several million. Lower molecular weight polyolefins whose molecular weight can be increased by chemical modification such as, for example, irradiation and peroxide treatment of the polymer, may be used also. It is preferred also that the melt index of such polymeric materials be less than 1. Based on the cost, ease of manufacture, and performance, polyethylenes having a molecular weight of at least 2.5 million and a melt index below 1 are particularly desirable material for use in the present invention. Recommended commercial products are those sold under the trademark HOSTALEN GUR and HIMONT, for example HOSTALEN GUR 412, 413 and 415, and HIMONT HB 312.

Accordingly, the amount of water-absorbent resins comprising the fluid-control device may vary over a wide range, the minimum amount being dictated by that needed to block the passage of the gas through filter element 50, as it is contacted therewith, and the maximum amount being about 100 wt. % of the resin. For example, a filter element 50 within the present invention may comprise about 0.5 to about 99 wt. % of the water-absorbent resin and about 1 to about 99 wt. % of filler. Preferred amounts of constituents comprise about 5 to about 15 wt. % resin and about 85 to 95 wt. % filler.

In operation, the present invention provides a small, portable, and easy to use end-line filtering apparatus to remove moisture from a stream of compressed air. For example, one may use the present invention to filter compressed air being utilized to pressurize the tires of an automobile or truck, or other inflatables. From a commercial or home air compressor or other source of compressed air, the user simply attaches air chuck (47, 47a, 47b) to valve stem of his or her tire or other inflatable, and simultaneously causes the pneumatic fitting or air chuck of the source of compressed air to mate with inlet fitting (41,41a). In this manner, the compressed air being used to pressurize the tire will first flow into chamber 28 and through filter element 50 which blocks or traps any moisture contained within the air. Substantially moisture free air then exits chamber 28 through outlet port 44 and travels into the inflatable being pressurized through outlet fitting 45 and air chuck (47,47a, 47b). The invention may be designed to have a larger volume filter chamber 28 and a larger size filter element 50 to be capable of delivering more cubic feet per minute (cfm) of filtered air. For example, the invention 10 may be configured to be capable of delivering in the range of 80 cfm which is a sufficiently high delivery rate to allow the invention to be utilized between the end of a pneumatic hose containing compressed air and a pneumatic powered tool such as a pneumatic impact wrench. In such an embodiment, the invention is preferably provided with quick-connect fittings at both the inlet port 40 and the outlet port 44 which allows for quick attachment and detachment of the device between the pneumatic hose and the pneumatic tool.

It is important that container 12, cap 20, means of securing cap 20 to container 12, inlet port 40 and inlet port threads 42, outlet port 44 and outlet port threads 46, inlet and outlet fittings (41,41a), air chuck (47,47a,47b), and filter element 50 be made of such materials and to such specifications, both being well known in the art, to be capable of withstanding air pressure within chamber 28 as might develop using pneumatic air compressors. It is thought that such components should be capable of withstanding at least 165 pounds per square inch (psi) of air pressure. The use of plastic or metal, both having many suitable varieties which are known in the art, to form members 12, 20 is thought preferable although numerous other materials exist and are well known in the art. The use of aluminum to form member 12,20 is thought to be preferable although the invention is not meant to be limited thereto.

While the foregoing description has set forth the preferred embodiment of the invention in particular detail, it must be understood that numerous modifications, substitutions and changes can be undertaken without departing from the true spirit and scope of the present invention as defined by the ensuing claims.

What is claimed is:

1. A one-stage end-line compressed air moisture filter apparatus to be utilized between an inlet valve of an inflatable and a pneumatic fitting on a terminal end of a pneumatic hose to filter moisture from a stream of compressed air, said apparatus comprising:

a housing member having a substantially closed filter chamber formed therein, and having formed therethrough an inlet port in a first end of said housing and an outlet port in a second end of said housing, such that said inlet port and said outlet port are spaced relative to one another and in fluid communication with said filter chamber;

an inlet fitting for fluid communication with said pneumatic fitting on a terminal end of a pneumatic hose, said inlet fitting positioned in said inlet port;

an outlet fitting positioned in said outlet port;

filter means positioned within said filter chamber for filtering moisture from said stream of compressed air; and, bias means positioned within said filter chamber for biasing said filter means into a surrounding relationship with said outlet port.

2. An apparatus as recited in claim 1, wherein said housing comprises first and second members and said apparatus further comprises attachment means for releasably attaching said first member to said second member.

3. An apparatus as recited in claim 2, wherein said first member is a cylindrically shaped container having an open end and a substantially closed end, and said second member is a cylindrically shaped cap having an open end and a substantially closed end, wherein one of said inlet and outlet ports is formed through said substantially closed end of said first member and the other of said inlet and outlet ports is formed through said substantially closed end of said second member, and said attachment means comprises first mating threads provided on at least a portion of said first member, and second mating threads provided on at least a portion of said second member.

4. An apparatus as recited in claim 1, wherein said filter means comprises a porous filter media having pores which allow the passage of air but substantially block the passage of moisture.

5. An apparatus as recited in claim 4, wherein said filter media comprises a water-insoluble, highly water-absorbent material.

6. An apparatus as recited in claim 4, wherein said filter media comprises a graft starch polymer.

7. An apparatus as recited in claim 2, wherein said filter means is cylindrically shaped and has an open end and a closed end.

8. An apparatus as recited in claim 7, wherein said filter means comprises a porous filter media having pores which allow the passage of air but substantially block the passage of moisture.

9. An apparatus as recited in claim 7, wherein said bias means biases said open end of said filter means into concentric orientation with said outlet port.

10. An apparatus as recited in claim 9, wherein said biasing means is a spring.

11. An apparatus as recited in claim 1, wherein said inlet fitting comprises a tank valve and said outlet fitting has threads formed therein.

12. An apparatus as recited in claim 11, further comprising an air chuck threadably attached to said outlet fitting and in fluid communication therewith.

13. An apparatus as recited in claim 12, wherein said air chuck is an elongated dual foot air chuck.

14. An apparatus as recited in claim 2, wherein said inlet fitting comprises a tank valve and said outlet fitting has threads formed therein.

15. An apparatus as recited in claim 14, further comprising an air chuck threadably attached to said outlet fitting and in fluid communication therewith.

16. An apparatus as recited in claim 1, wherein said inlet fitting comprises means for being releasably attached to said pneumatic fitting located on the terminal end of a pneumatic hose.

17. An apparatus as recited in claim 1, wherein said outlet fitting comprises means for releasably clamping onto said inlet valve of said inflatable.

18. An apparatus as recited in claim 1, wherein said outlet fitting includes means for being releasably attached in fluid communication to an air chuck.

19. An apparatus as recited in claim 18, further comprising an air chuck attached to said outlet fitting and in fluid communication with said outlet fitting.

20. An apparatus as recited in claim 1 wherein said inlet valve means is a tank valve and said outlet fitting comprises an air chuck in fluid communication with said filter chamber.

21. An apparatus as recited in claim 1, wherein said outlet fitting comprises an air chuck.

22. An apparatus as recited in claim 21 wherein said air chuck comprises quick-connect means for releasably retaining said air chuck in fluid communication with said inlet valve of said inflatable.

23. A one-stage end-line compressed air moisture filter apparatus for removing moisture from a stream of compressed air between a pneumatic fitting on a terminal end of a pneumatic hose and a pneumatic article, said filter apparatus comprising:

a housing having a substantially closed filter chamber formed therein and having an inlet port formed through a first end thereof and an outlet port formed through a second end thereof such that said inlet port and said outlet port are spaced relative to one another and in fluid communication with said filter chamber;

an inlet fitting positioned in said inlet port for fluid communication with said pneumatic fitting on said terminal end of said pneumatic hose;

an outlet fitting positioned in said outlet port for fluid communication with said pneumatic article;

filter means positioned within said filter chamber for filtering moisture from said stream of compressed air; and, bias means positioned within said filter chamber for biasing said filter means into a surrounding relationship with said outlet port.

24. An apparatus as recited in claim 23, wherein said pneumatic article is a pneumatically powered tool and wherein said outlet fitting of said moisture filter apparatus includes means for releasably attaching said outlet fitting in fluid communication to a complimentary mating pneumatic fitting of said pneumatically powered tool.

25. An apparatus as recited in claim 24, wherein said means for releasably attaching said outlet fitting to a complimentary mating pneumatic fitting of said pneumatically powered tool comprises a quick-connect pneumatic fitting.

26. An apparatus as recited in claim 23, wherein said filter means comprises a porous filter media having pores which allow the passage of air but substantially block the passage of moisture.

27. An apparatus as recited in claim 26, wherein said filter media comprises a water-insoluble, highly water-absorbent material.

28. An apparatus as recited in claim 26, wherein said filter media comprises a graft starch polymer.

29. An apparatus as recited in claim 23, wherein said filter means is cylindrically shaped and has an open end and a closed end.

30. An apparatus as recited in claim 29, wherein said bias means biases said open end of said filter means into concentric orientation with said outlet port.

31. An apparatus as recited in claim 30, wherein said biasing means is a spring.

32. An apparatus as recited in claim 23, wherein said housing comprises first and second members and said apparatus further comprises attachment means for releasably mating said first and second members.

33. An apparatus as recited in claim 32, wherein said first member is a cylindrically shaped container having an open end and a substantially closed end, and said second member is a cylindrically shaped cap having an open end and a substantially closed end, wherein one of said inlet and outlet ports is formed through said substantially closed end of said cap and the other of said inlet and outlet ports is formed through said substantially closed end of said container, and said attachment means comprises first mating threads provided on at least a portion of said container, and second mating threads provided on at least a portion of said cap.

34. An apparatus as recited in claim 23, wherein said end-line moisture filter delivers at least 80 cubic feet per minute of filtered air from said outlet fitting.

* * * * *